United States Patent
Hobbs et al.

(10) Patent No.: US 7,107,583 B2
(45) Date of Patent: Sep. 12, 2006

(54) METHOD AND APPARATUS FOR REDUCING CACHE THRASHING

(75) Inventors: Steven Orodon Hobbs, Westward, MA (US); Erin Elizabeth Chapyak, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 722 days.

(21) Appl. No.: 09/785,143

(22) Filed: Feb. 16, 2001

(65) Prior Publication Data

US 2002/0199178 A1  Dec. 26, 2002

(51) Int. Cl.
*G06F 9/45* (2006.01)
(52) U.S. Cl. .................................. 717/150; 717/160
(58) Field of Classification Search ............ 717/150, 717/159–161
See application file for complete search history.

(56) References Cited

U.S. PATENT DOCUMENTS

| | | | | |
|---|---|---|---|---|
| 5,704,053 A | * | 12/1997 | Santhanam | 717/158 |
| 5,797,013 A | * | 8/1998 | Mahadevan et al. | 717/160 |
| 5,862,385 A | * | 1/1999 | Iitsuka | 717/156 |
| 5,950,007 A | * | 9/1999 | Nishiyama et al. | 717/161 |
| 6,539,541 B1 | * | 3/2003 | Geva | 717/150 |

OTHER PUBLICATIONS

Carr, et al., "Compiler Optimizations for Improving Data Locality", 1994, ACM, p. 252-262.*

* cited by examiner

*Primary Examiner*—Tuan Dam
*Assistant Examiner*—Andre R. Fowlkes

(57) ABSTRACT

A method for compiling a program to reduce the possibility of cache thrashing is provided. The method comprises identifying a loop in a program, identifying each vector memory reference in the loop, and determining dependencies between the vector memory references in the loop. Determining the dependencies includes determining unidirectional and circular dependencies. Thereafter, the vector memory references are distributed into a plurality of detail loops, wherein the vector memory references that have circular dependencies therebetween are included in a common detail loop, and the detail loops are ordered according to the unidirectional dependencies between the memory references.

33 Claims, 4 Drawing Sheets

METHOD AND APPARATUS FOR REDUCING CACHE THRASHING

BACKGROUND OF THE INVENTION

1. Field of the Invention

The present invention relates generally to software compilers and, more particularly, to a compiler that restructures program loops to reduce cache thrashing.

2. Description of the Related Art

In modem computer systems, a significant factor in determining the overall performance of the computer system is the speed with which it accesses memory. Generally, faster memory accesses result in higher performance. Unfortunately, however, high-speed memory is expensive. Thus, it is generally economically unfeasible to construct a computer system that uses high-speed memory components as its main memory.

Many modem computer systems employ a memory system that consists of a hierarchy of several different levels. That is, the computer system has a relatively large and inexpensive main memory, which may be comprised of a relatively slow dynamic RAM, or the like, and at least one relatively small high-speed cache. The computer system attempts to maximize its speed of operation by utilizing the high-speed cache as much as possible, as opposed to the slow main memory. In fact, many computer systems have prefetch and cache management instructions that are highly successful when used with software that can predict the portions of main memory that are likely to be needed. The prefetches and cache management instructions can optimize moving data between the main memory and the caches. Thus, as long as the predictions are accurate, each request for memory should result in a hit in the cache, and faster overall operation.

The process of predicting the portions of memory that will be needed is, of course, dynamic and continually changing. That is, the prefetch and cache management instructions may predict that a portion A of memory is needed, prefetch the portion A, and load the portion A into the high-speed cache. However, before the portion A of memory is actually used, or while it is still needed, the prefetch and cache management instructions may predict that a portion B of memory will be needed shortly, and load the portion B into the high-speed cache. Owing to the relatively small size and/or organization of the high-speed cache, storing the portion B in the high-speed cache may overwrite or otherwise remove the portion A from the high-speed cache. Accordingly, the portion A will not be available in the high-speed cache when needed by the computer system. This process of loading the cache with memory and then removing it while it is still needed or before it can be used by the computer system is an example of "cache thrashing."

Cache thrashing is, of course, undesirable, as it reduces the performance gains generated by prefetch and cache management instructions, and greatly reduces computer system performance. In fact, once cache thrashing begins, prefetch and cache management instructions may actually exacerbate the problem.

Historically, programmers have attempted to eliminate or reduce cache thrashing by restructuring the data used by a program so as to reduce or eliminate conflicts in the cache. That is, programmers have attempted to organize the data so that it is unlikely that the program will need access to two different sets of data that cannot exist simultaneously in the cache. The process of restructuring data has proven difficult to automate, chiefly because the program as a whole must be analyzed to determine if restructuring the data affects other data accesses. During compilation, however, the entire program may not be available, as the compilation process may be applied at separate times to separate pieces of the program. Also, restructuring the data to eliminate thrashing based on one portion of the program, may create thrashing in another portion of the program. Further, the sheer complexity of this analysis increases the likelihood that the restructuring will not optimize the program as a whole with respect to reducing cache thrashing.

The present invention is directed to overcoming or at least reducing the effects of one or more of the problems mentioned above.

SUMMARY OF THE INVENTION

In one aspect of the present invention a method comprises identifying a loop in a program. Each vector memory reference in the loop is identified, and dependencies between the vector memory references in the loop are determined. The vector memory references are then distributed into a plurality of detail loops, wherein the vector memory references that have dependencies therebetween are included in a common detail loop.

In another aspect of the present invention a method comprises identifying a loop in a program, identifying each vector memory reference in the loop, and determining dependencies between the vector memory references in the loop. Determining the dependencies includes determining unidirectional and circular dependencies. Thereafter, the vector memory references are distributed into a plurality of detail loops, wherein the vector memory references that have circular dependencies therebetween are included in a common detail loop, and the detail loops are ordered according to the unidirectional dependencies between the memory references.

BRIEF DESCRIPTION OF THE DRAWINGS

The invention may be understood by reference to the following description taken in conjunction with the accompanying drawings, in which like reference numerals identify like elements, and in which.

Figure 1:
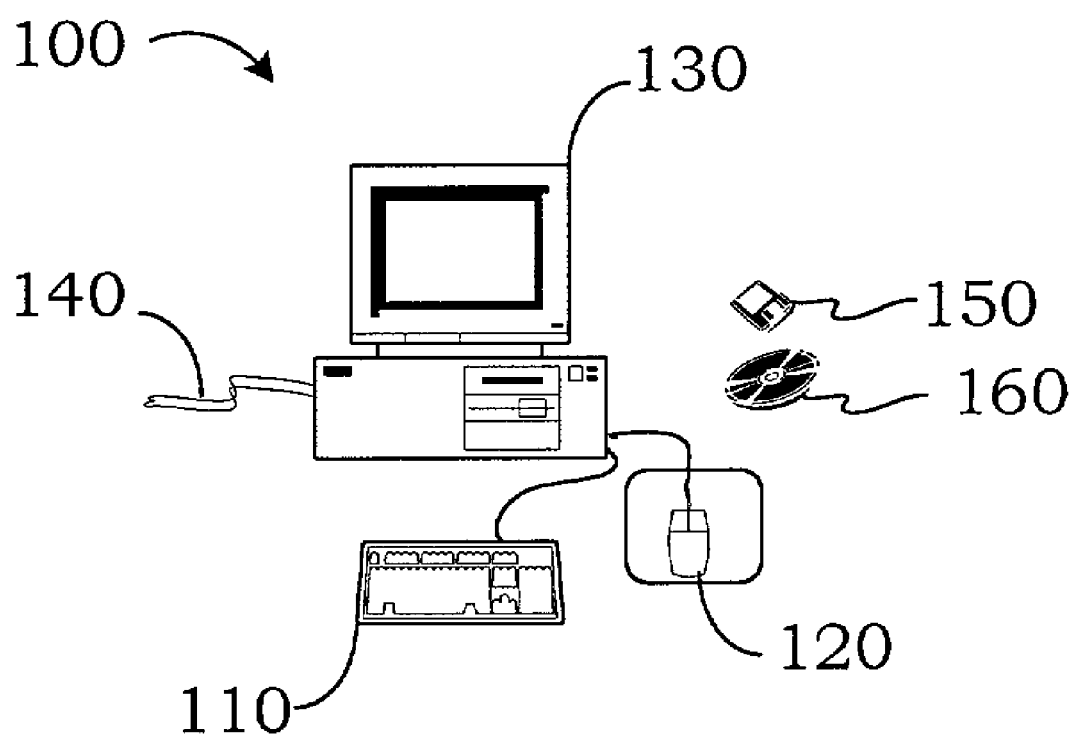
FIG. 1 depicts a computer as may be used to implement the invention in one particular embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the programmers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Turning now to FIG. 1, one embodiment of a computer 100 that may be used to implement the instant invention is shown. The computer 100 may be used to compile a source program in accordance with one aspect of the instant invention, to execute a target program that has been compiled according to one aspect of the instant invention, or both. The computer 100 includes standard input/output devices such as a keyboard 110, mouse 120, and monitor 130 with which a programmer may interact with the compiler and/or application program. This interaction is performed in accordance with conventional practices by which programmers interface with software. The computer 100 may include a network connection 140 so that a programmer may interface with the compiler and/or application program over a network (not shown) through the computer 100. However, this is not necessary to the practice of the invention.

FIG. 1 also illustrates a magnetic floppy disk 150 and an optical disk 160. The compiler and/or application program may be encoded on a variety of program storage media, whether optical, magnetic, or otherwise in nature, such as the floppy disk 150 and the optical disk 160. The compiler and/or application program may also be encoded on the hard disk (not shown) of the computer 100. Thus, in alternative embodiments, the invention may comprise instructions that, when executed by a computer, perform a method implemented by the compiler and/or the application program. Similarly, the invention may comprise a computer, e.g., the computer 100, programmed to implement the functions of the compiler.

Figure 2:
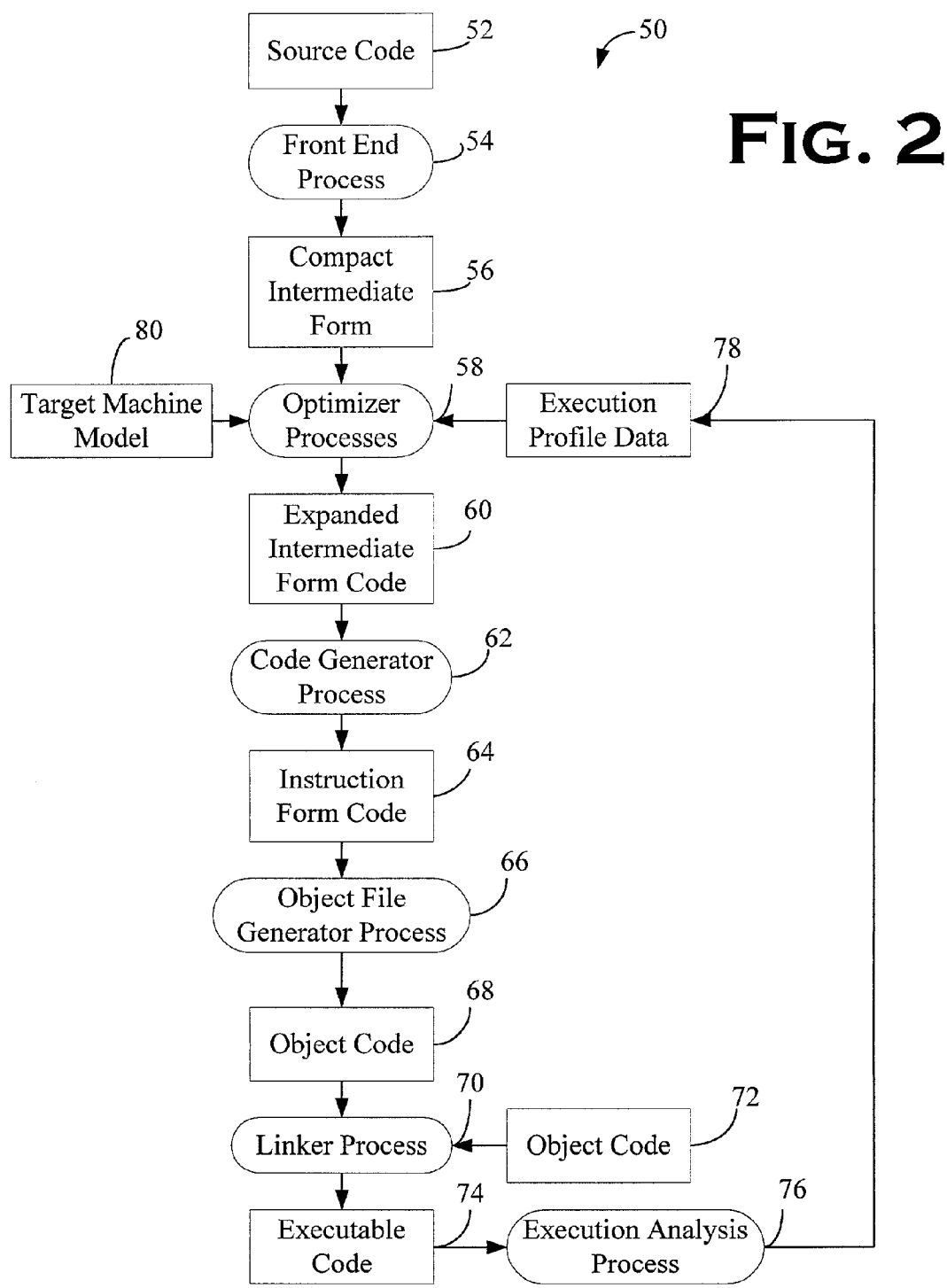
FIG. 2 is a flowchart illustrating a sequence of compilation procedures performed by software operating on the computer of FIG. 1.

The overall operation of the compiler is generally illustrated in flow chart form in FIG. 2. FIG. 2 is a flowchart illustrating a sequence of compilation procedures 50 applied to relatively higher level source code 52 to compile it into relatively low level executable machine code 74 in the computer 100, as well as the beginning and/or intermediate products produced by and/or input to procedures 50. It should be noted at the outset of the discussion of FIG. 2 that the procedures 50 are not limited to being practiced on the same computer 100 in which the code 74 is run. Rather, the procedures 50 may be practiced on a different computer system and the code 74 may be executed on the computer 100, or vice versa. In the compilation sequence 50, the first process to be applied to the source code 52 is front end process 54. Using conventional techniques, the front end process 54 translates the source code 52 into a compact intermediate form of code 56. The intermediate code 56 is then processed by optimization processes 58. This processing of the code 56 by the processes 58 will be described in greater detail below, but in general, the processes 58 expand the code 56 into an expanded intermediate form 60 that is suitable for processing by a conventional code generator process 62, and in doing so, transform the instructions and structure of the code 56 so as to provide a more efficient code 60. The code 60 produced by the optimization processes 58 is in an intermediate level program code language that is substantially independent of the architecture of the computer on which it is to be executed. The optimization processes may perform this transformation of the code 56 based upon, among other things, execution profile data 78 generated by an execution analysis process 76.

In essence, the process 76 generates data 78 by initially executing the code 74 using the computer 100, and then observing and analyzing the manner in which the code 74 uses resources (e.g., processor, cache, main memory, and components thereof) in the computer 100 when it is initially executing. The process 76 then generates execution profile data 78 that represents the results of its observations and analysis of execution of the code 74. The optimization process 58 may then use the data 78 to generate a new, more efficient version of the form 60, which then is processed by the other processes in the sequence 50 to generate a new, more efficient version of the code 74. The code generator process 62 translates the expanded intermediate code 60 into instructions 64 that are specific to the architecture of the computer on which it will be executed. In generating the code 64, the generator 62 modifies the code 60 such that the code 64 reflects scheduling and other low-level optimizations of the code 60, which are dependent on the architecture of the computer that will execute the code.

The object code 68 is then generated by a conventional process 66 from the code 64. A conventional linker 70 then combines the object code 68 with the other object code 72 (e.g., from library object code) to produce machine-dependent code 74 that is executable by the computer 100. As discussed previously, the executable code 74 is executed by the process 76 to generate the execution profile data 78 that is used by the processes 58 to determine whether the code 74, when executed, exhibits optimal execution performance, and if the code 74 does not exhibit optimal execution performance, may be used by the processes 58 to make more optimal versions of the code 60 from which more optimal versions of the code 74 may be generated.

Figure 3:
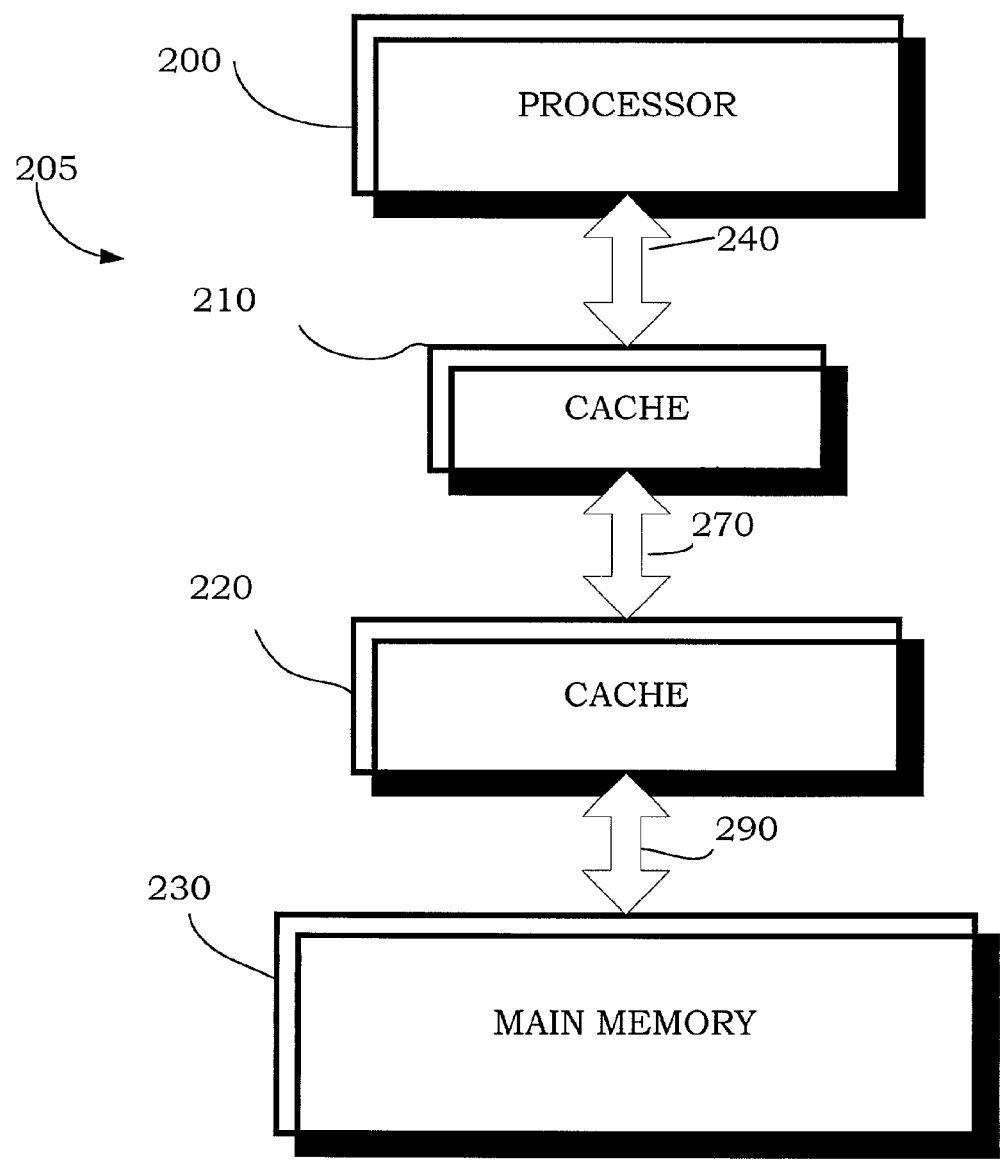
FIG. 3 illustrates a block diagram of one embodiment of a portion of the computer of FIG. 1.

Turning now to FIG. 3, one embodiment of a portion of the computer 100 is shown in block diagram form. The computer 100 may be used to compile software, to execute the compiled software, or both. The computer 100 includes a scalar processor 200, such as a reduced instruction set computer (RISC) or a complex instructions set computer (CISC). Examples of RISC type processors on which the instant invention may be implemented include the Alpha® processors from Compaq and SPARC® processors from SUN. Examples of CISC type processors on which the instant invention may be implemented include X86 processors from Intel, AMD's K6® and K7® processors, and the like.

In the illustrated embodiment the processor 200 communicates with a memory system 205 that is organized into a first cache 210, a second cache 220, and a main memory 230. Two-level caches, such as that shown schematically in FIG. 2 are known to those skilled in the art, and, thus, are not described in detail herein. Rather, the memory system 205 is generally described herein to aid in the understanding of the operations of the compiler described herein. Accordingly, the instant invention is not limited to the particular construct of the memory system 205 shown herein, but has wider application to a variety of multi-level hierarchical memory systems.

Requests to read from (or write to) the memory system 205 are first routed to the relatively small, high-speed cache 210 over lines/bus 240. If the requested information is located in the first cache 210 (a hit), the requested data is read from the first cache 210 and delivered over the lines/bus 240 to the processor 200. On the other hand, if the requested data is not present in the first cache 210 (a miss), then the request is passed to the second cache 220 over lines/bus 270.

The second cache 220 operates in a manner similar to the first cache 210, passing data over lines/bus 270, 240 into the cache 210 and the processor 200 in response to the data being found in the second cache 220. Similarly, if the data is not found in the second cache 220, then the request is passed to the main memory 230, where it is retrieved and delivered over lines/bus 290, 270, 240 into the caches 220, 210 and the processor 200.

Operation of the memory system 205 has been described as a serial operation, methodically passing through the first cache 210, second cache 220, and main memory 230. However, the instant invention may also have application in a memory system 205 that allows for at least some parallel operations. That is, a second request for data from the processor 200 need not wait for completion of a first request.

The organization of the caches 210, 220 may contribute to or cause thrashing. If at least one of the caches 210, 220 is organized as N-way associative, and a software program operating on the computer 100 does not consider this organization, then thrashing may manifest itself. For example, the cache 210, 220 that is N-way associative is structured with n-banks of memory. Each location of the main memory 230 can be placed in one particular location of each of the N-banks. Consider the example of a 2-way associative cache where each memory location can only be placed in 2 different locations within the cache. Memory locations that would use the same locations within the cache are called "synonyms." If 3 memory locations are synonyms, then it is impossible for all 3 memory locations to be copied into the 2-way associative, high-speed cache at the same time. If the cache already contains 2 of the synonyms then an attempt to place the third synonym into the cache will evict one of the other 2 synonyms.

Consider the following source program loop:

DO 40j=1,n $d(j)=a(j)+b(j)*c(j)$

CONTINUE and suppose the arrays a(j), b(j), and c(j) are allocated such that corresponding elements of these array are synonyms. During the execution of the first iteration of this loop, the data representing a(1) . . . a(8) are brought into the cache, and a(1) is used; then the data representing b(1) . . . b(8) are brought into the cache, and b(1) is used; then the data representing c(1) . . . c(8) are brought into the cache (evicting a(1) . . . a(8) because we cannot have 3 synonyms in the cache at the same time) and c(1) is used. During the second iteration of the loop, the data representing a(1) . . . a(8) are brought into the cache (evicting b(1) . . . b(8) because 3 synonyms cannot exist in the cache at the same time) and a(2) is used; then the data representing b(1) . . . b(8) are brought into the cache (evicting c(1) . . . c(8) because 3 synonyms cannot exist in the cache at the same time) and b(2) is used then the data representing c(1) . . . c(8) are brought into the cache (evicting a(1) . . . a(8) because 3 synonyms cannot exist in the cache at the same time) and c(2) is used. Similarly, the process repeats for the remaining iterations of the loop. This is an example where arrays a, b, and c are thrashing the cache.

The thrashing described above in the 2-way associative cache could be removed by using a computer 100 with 3 (or more) banks of cache memory, which would allow more associativity and more synonyms to be simultaneously stored in the cache. However, the instant invention can also remove the cache thrashing without requiring more banks of cache memory, but rather, by restructuring the loop via loop distribution. Additionally, the compiler operates to insert prefetch and other cache management instructions into the distributed loops to further enhance the speed of memory access. The restructuring makes it possible to insert prefetch and other cache management instructions without increasing the likelihood of cache thrashing.

Vectorizatlon techniques, including loop distribution and strip mining, have been used in compilers for vector processors and are known to those skilled in the art. However, these vectorization techniques have been used in the past to improve the performance of vector processors, not to improve cache management of a scalar processor, as describe herein.

Figure 4:
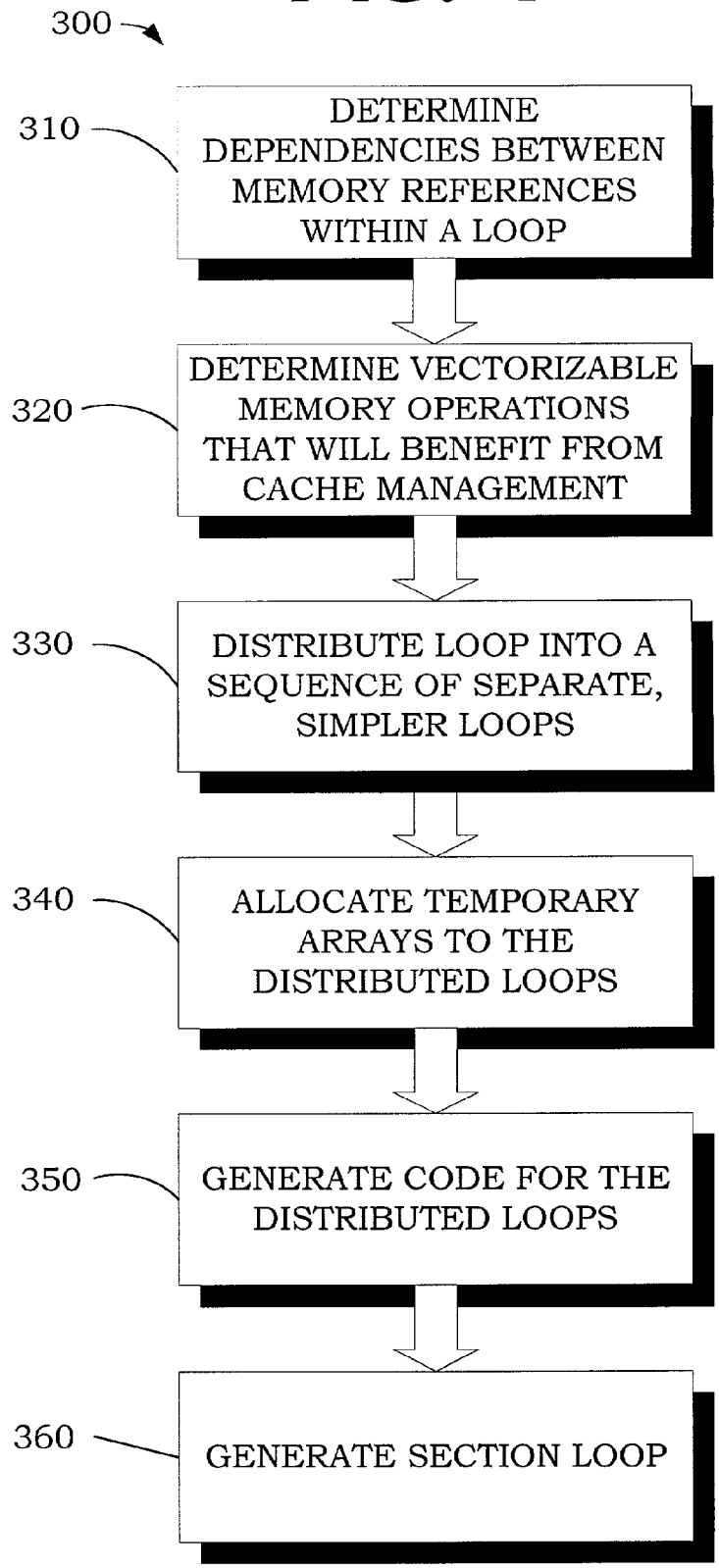
FIG. 4 illustrates a flow chart of one particular implementation of a portion of a compiler that generates code to be executed by the computer of FIGS. 1 and 3.

Referring now to FIG. 4, a flowchart of a portion of one embodiment of the compiler of the instant invention is shown. In particular, the flowchart of FIG. 4 shows a loop restructuring routine 300 of the compiler. A compiler that may be modified to include the restructuring routine 300 is described in copending U.S. patent application Ser. No. 09/416,436, which is hereby incorporated by reference in its entirety. The restructuring routine 300 performs loop distribution as a function of cache behavior with respect to the memory functions performed within the loop. That is, the loop is restructured in response to determining that the memory references within the loop may cause cache thrashing to occur. Further, the restructuring of the loop is performed in a manner to reduce the likelihood that cache thrashing will occur.

The loop restructuring routine 300 begins at block 310 by performing use dependence analysis, which determines dependencies between memory references in the loop, and how the loop with vectorizable operations may be distributed into multiple, separate loops. Dependence analysis is a known technique to those skilled in the art, and thus, is not described in detail herein to avoid unnecessarily obscuring the instant invention. A more detailed discussion of dependence analysis may be found in Optimizing Supercompilers for Supercomputers, Research Monographs in Parallel and Distributed Processing, edited by Michael Wolfe, MIT Press, Cambridge, Mass., 1989; High Performance Compilers for Parallel Computing by Michael Joseph Wolfe, Leda Ortega (Editor), Carter Shanklin (Editor) Addison-Wesley Pub. Co.; January, 1996; or Dependence Analysis for Subscripted Variables and its Application to Program Transformations, Rice University Ph.D. thesis by John Randal Allen, April, 1983, Houston, Tex. For a proper understanding the instant invention, it is sufficient to understand that dependence analysis will identify memory operations that have some dependency upon one another, and thus should be ordered or combined into the same detail loop. If there is a bi-directional dependency, or a cyclic dependency cycle, between a subset of vector memory operations then all those cyclically related vector memory operations are placed in the same detail loop. However, if there is a uni-directional dependency between two vector memory operations, then those two operations can be placed in separate detail loops, providing the loops are ordered to preserve the dependency. That is, where two vector memory operations are uni-directionally dependent, they may be placed in separate detail loops as long as these separate detail loops are executed in an order that preserves the unidirectional dependency. Alternatively, the two bi-directionally dependent memory operations should be maintained in a single detail loop.

At block 320 the loop restructuring routine 300 determines which vectorizable memory operations in the source program loop will benefit from cache management. In one embodiment, accesses to a memory array that has a stride of one are identified for loop restructuring. That is, a memory array that has a plurality of elements stored in adjacent memory locations is identified as a candidate for loop restructuring. It is envisioned that loop restructuring may be advantageously performed on memory arrays with longer strides also, and is not limited to only those arrays in adjacent memory locations. The particular organization and construction of the cache memory in the computer on which the compiled program is to be executed will influence the length of stride in an array that will benefit from loop restructuring.

It will be appreciated that the vectorizable memory operations may fall within three general groups. Memory operations that read a vector, memory operations that modify a vector, and memory operations that define a vector are all vectorizable memory operations. However, different cache management instructions may be useful to enhance the operation of the cache, depending on the type of vectorizable memory operation being restructured.

At block 330 the source program loop is distributed into a strip mined sequence of separate, simpler loops, where each simpler loop may contain at least one vectorizable memory reference that could benefit from cache management. Strip mining is a technique well known to those skilled in the art, and thus, is not described in detail herein to avoid unnecessarily obscuring the instant invention. Strip mining generally involves separating a relatively long loop into a series of shorter strips. In one embodiment, these shorter strips have a size such that the strips fit within the cache memory of the target computer. Exemplary strip mining operations are identified in specific loop restructuring examples set forth below. In one embodiment, the separate, simpler loops are formed of inner loops called "detail loops," and outer loops, which surround the detail loops, called "section loops." While each of the exemplary loop restructurings set forth below are shown with at least one memory operation contained in each detail loop, the invention is not so limited. Though somewhat less efficient, the loop restructuring could include detail loops that do not include any memory references or which include multiple memory references without departing from the spirit and scope of the instant invention.

Generally, distributing the memory operations into a plurality of separate loops causes the compiler to generate temporary arrays to store intermediate results from each of the separate loops. Thrashing of the cache due to the temporary arrays may be readily controlled by selecting the location and size of the temporary arrays to fit within the particular cache size and organization of the target computer. In block 340, the temporary arrays that were created as a result of loop distribution are allocated. In one embodiment, the total size of the temporary arrays should not exceed the size of one bank of the cache memory, and the locations of the various temporary arrays should be chosen such that none of the locations of the temporary arrays are synonyms with other locations of the temporary arrays. However, where the target computer 100 has a cache with a substantial number of banks of associative memory, the total size of the temporary arrays can be the size of several banks of the cache, provided that the locations chosen for these temporary arrays limit the number of possible synonyms.

In block 350, code for each of the detail loops is generated by the compiler. At this point it is possible to further optimize the operation of the cache by including features such as loop unrolling, software pipelining, or cache management instructions, such as prefetch instructions.

In block 360, a section loop that surrounds the distributed detail loops is generated. The step size of the section loop is a function of the size of the temporary arrays. That is, the step size of the section loop is selected to be the same as the size of the temporary arrays so that the section loop causes the detail loops to progress through the entire array, one strip of memory at a time.

As one example of the process involved in restructuring a loop, consider the following examplary loop:

DO 40 j=1,n $d(j)=a(j)+b(j)*c(j)$

40 CONTINUE.

There are four different user arrays being used in a vectorizable manner by this loop (arrays a( ), b( ), c( ), and d( )). It is possible that 2 or more of these arrays may combine to cause cache-thrashing in the computer 100. The technique of this invention is to distribute this one complex loop into four detail loops, each containing only one vectorizable reference to a user array. This will reduce the likelihood of cache thrashing between the user arrays.

One exemplary distribution of the above-described loop into a section loop and detail loops according to the principles of the instant invention is set forth in the following code:

do 40 j_outer=1, n,m
  do 401 i=0, min(m−1, n−j$_{13}$ outer)
401 t1(i)=a(j_outer+i)
  do 402 i=0, min(m−1, n−j$_{13}$ outer)
402 t2(i)=b(j_outer+i)
  do 403 i=0, min(m−1, n−j$_{13}$ outer)
403 t3(i)=c(j_outer+i)
  do 404 i=0, min(m−1, n−j$_{13}$ outer)
404 d(j_outer+i)=t1(i)+t2(i)*t3(I)
40 continue, where t1( ), t2( ) and t3( ) are temporary arrays of size m, where 3*m is less than the cache bank size, and where t1( ), t2( ) and t3( ) are allocated consecutively so that none of the temporary array elements are cache synonyms. Since there are three temporary arrays, their size is limited to no more than ⅓ of the available space in one bank of the cache memory so that all three can fit within that bank of the cache at the same time.

In the exemplary loop distribution set forth above, the four memory references are separated into four detail loops 401, 402, 403, and 404. A section loop 40 surrounds the detail loops 401, 402, 403, and 404. Each of the detail loops 401, 402, 403 serially proceeds through a first strip (m values) of their respective arrays a( ), b( ), and c( ), retrieving the desired data and storing it in the temporary arrays t1( ), t2( ) and t3( ). In the detail loop 404, the temporary arrays are added and multiplied together according to the identified formula, and the results for the first strip are stored in the array d( ). Thereafter, the section loop iterates by the value m, and the detail loops serially proceed through the next m values of their respective arrays a( ), b( ), c( ), and d( ). The section loop again iterates by the value m, and the process repeats until the detail loops have progressed entirely through their respective arrays.

The exemplary loop distribution set forth above avoids, or at least minimizes, cache thrashing. As discussed above, no cache thrashing occurs between the temporary registers because their size and location are selected by the compiler to avoid the presence of synonyms. Further, no thrashing can occur between the arrays a( ), b( ), c( ), and d( ) because the processing of each strip of each array is completed before the next strip of the next array is accessed, owing to their location in separate detail loops.

As mentioned previously, the operation of the cache may be further optimized using, for example, cache management instructions. The computer 100 may include a variety of prefetch and cache management instructions that can migrate data between the system memory and the high-speed cache. For example, the computer 100 may include instructions such as "prefetch-read," "prefetch-evict-next," "prefetch-modify," "prefetch-modify-evict-next," "write-hint," "evict," and the like. One description of these type instructions may be found in Alpha Architectural Reference Manual, 3$^{rd}$ Edition, written by the Alpha Architecture Committee and published by Digitial Press, which is hereby incorporated herein by reference in its entirety. Generally, however, the "prefetch-read" instruction copies a line of data from system memory to the cache (possibly evicting a synonym). The "prefetch-evict-next" instruction does the prefetch-read operation, and additionally, marks the line of newly prefetched data such that it will be chosen for eviction the next time a synonym is loaded into the cache. The "prefetch-modify" instruction does the prefetch-read operation, and additionally, prepares to modify the line of data in the cache. The "prefetch-modify-evict-next" instruction does a combination of the prefetch-modify and prefetch-evict-next instructions. The "write-hint" instruction prepares a cache line for being written by the program without the overhead of prefetching that line of data from the memory. The "evict" instruction removes a line of data from the cache (which includes copying modified cache data down into system memory). The Compaq Alpha® architecture includes each of these prefetch and cache management instructions.

One exemplary distribution of the above-described loop into a section loop and detail loops that include further optimization using at least some of the above-described cache management instructions, as well as loop unrolling is set forth in the following code:

```
PARAMETER (m=256)
DOUBLE PRECISION t1(m), t2(m), t3(m)
      ...
      DO 40 i = 1, n, m
            CALL CQ_ZT_VT (MIN (m, n-i+1), t1, b(i))
            CALL CQ_ZT_VT (MIN (m, n-i+1), t2, c(i))
            CALL CQ_ZT_VT (MIN (m, n-i+1), t3, a(i))
            CALL CQ_VT_ZT_ZT_ZT_OM_OA (MIN (m, n-i+1), t1, b(i)
      40 CONTINUE
      SUBROUTINE CQ_ZT_VT (len, dest, S1)
      ...COPY (From prefetched vector to temporary array in the cache)
      REAL*8 dest 0:*), S1(0:*)
      INTEGER *8 i, len
      CALL DFOR$PREFETCH_EVICT_NEXT (S1 (0))
      CALL DFOR$PREFETCH_EVICT_NEXT (S1 (8))
      CALL DFOR$PREFETCH_EVICT_NEXT (S1 (16))
      CALL DFOR$PREFETCH_EVICT_NEXT (S1 (24))
      DO i = 0, len - 33, 8
            CALL DFOR$PREFECTCH_EVICT_NEXT (S1 (i + 32))
            DEST (i) = S1 (i)
            DEST (i + 1) = S1 (i + 1)
            DEST (i + 2) = S1 (i + 2)
            DEST (i + 3) = S1 (i + 3)
            DEST (i + 4) = S1 (i + 4)
            DEST (i + 5) = S1 (i + 5)
            DEST (i + 6) = S1 (i + 6)
            DEST (i + 7) = S1 (i + 7)
      END DO
      CALL DFOR$PREFETCH_EVICT_NEXT (S1 (len - 1))
      DO i = i, len - 1
              Dest (i) = S1 (i)
            END DO
            RETURN
            END
            SUBROUTINE CQ_VT_ZT_ZT_ZT_OM_OA (len, dest, T1, T2, T3)
            ...MULT then ADD then STORE then evict-from--the-cache
            REAL * 8 dest (0:*), T1(0:*), T2(0:*), T3(0:*)
            INTEGER * 8 len, I
If (len .gt. 14) CALL DFOR$WRITE_HINT (dest(7))
If (len .gt. 22) CALL DFOR$WRITE_HINT (dest(15))
      DO I = 0, len - 31, 8
            CALL DFOR$WRITE_HINT (dest (1 + 23))
                  CALL DFOR$EVICT_CACHE_BLOCK (dest (i - 32))
                  dest (i) = T1(i) + T2(i) * T3(i)
                  dest (i+1) = T1(i+1) + T2(i+1) * T3(i+1)
                  dest (i+2) = T1(i+2) + T2(i+2) * T3(i+2)
                  dest (i+3) = T1(i+3) + T2(i+3) * T3(i+3)
                  dest (i+4) = T1(i+4) + T2(i+4) * T3(i+4)
```

```
        dest (i+5) = T1(i+5) + T2(i+5) * T3(i+5)
        dest (i+6) = T1(i+6) + T2(i+6) * T3(i+6)
        dest (i+7) = T1(i+7) + T2(i+7) * T3(i+7)
    END DO
    DO I = I, LEN – 1
        dest (i) = T1(i) = T2(i) * T3(i)
    END DO
    CALL DFOR$EVICT_CACHE_BLOCK (dest (len – 62))
    CALL DFOR$EVICT_CACHE_BLOCK (dest (len – 54))
    CALL DFOR$EVICT_CACHE_BLOCK (dest (len – 46))
    CALL DFOR$EVICT_CACHE_BLOCK (dest (len – 38))
    RETURN
    END
```

The section loop 40 includes four detail loops represented by the subroutine calls, CALL CQ_ZT_VT and CALL CQ_VT_ZT_ZT_ZT_OM_OA. Additionally, operation of the cache has been further optimized by the loop restructuring routine 300 by inserting the above-described cache management instructions. For example, the subroutine CALLs to DFOR$PREFETCH_EVICT_NEXT, DFOR$WRITE_HINT, and DFOR$EVICT_CACHE_BLOCK represent use of the prefetch-evict-next, write-hint, and evict-cache-block cache management instructions. The loop restructuring routine 300 has also performed loop unrolling to produce the series of commands that transfer data into the temporary array DEST( ). Loop unrolling improves performance by reducing the number of prefetches executed. For example, one prefetch can be used to obtain the data for multiple iterations of the loop body.

In an alternative embodiment, it may be useful to group store and fetch memory operations into a single detail loop. Some processors delay and queue store operations, rather than execute them immediately. Thus, a detail loop containing only a vectorizable store operation may allow the memory system to move into an idle state. However, by grouping one or more fetch operations with the store operations in a single detail loop, then activity of the memory system is insured.

Consider again the Fortran example used above:

DO 40 j=1,n d(j)=a(j)+b(j)*c(j)

40 CONTINUE

Another way to distribute this computation into separate loops is the following:
PARAMETER (m=256)
DOUBLE PRECISION t1(m),t2(m),t3(m)
    DO40i=1,n,m
        CALL CQ_ZT_VT (MIN(m, n–i+1), t1, b(i))
        CALL CQ_ZT_VT (MIN(m, n–i+1), t2, c(i))
        CALL CQ_VT_VT_ZT_ZT_OM_OA(MIN(m, n–i+
            1), d(i), a(i), t1, t2)
40 CONTINUE where the routine CQ_ZT_VT is the same as defined above and the routine CQ_VT_VT_ZT_ZT_OM_OA is defined by:
SUBROUTINE CQ_VT_VT_ZT_ZT_OM_OA(len, dest, src, T2, T3)
C dest(0:len–1)=src(0:len–1)+T2(0:len–1)*T3(0:len–1)
C with write-hinting of dest and prefetching of src
REAL*8 dest(0:*), src(0:*), T2(0:*), T3(0:*)

INTEGER*8 len, i
CALL DFOR$PREFETCH_EVICT_NEXT(src(0))
CALL DFOR$PREFETCH_EVICT_NEXT(src(8))
CALL DFOR$PREFETCH_EVICT_NEXT(src(16))
CALL DFOR$PREFETCH_EVICT_NEXT(src(24))
if (len .gt. 14) CALL DFOR$WRITE_HINT(dest(7))
if (len .gt. 22) CALL DFOR$WRITE_HINT(dest(15))
DO i=0, len –31, 8
    CALL DFOR$PREFETCH_EVICT_NEXT(src(i+32))
        CALL DFOR$WRITE_HINT(dest(i+23))
    CALL DFOR$EVICT_CACHE_BLOCK(dest(i–32))
    dest(i)=src(i)+T2(i)*T3(i)
    dest(i+1)=src(i+1)+T2(i+1)*T3(i+1)
    dest(i+2)=src(i+2)+T2(i+2)*T3(i+2)
    dest(i+3)=src(i+3)+T2(i+3)*T3(i+3)
    dest(i+4)=src(i+4)+T2(i+4)*T3(i+4)
    dest(i+5)=src(i+5)+T2(i+5)*T3(i+5)
    dest(i+6)=src(i+6)+T2(i+6)*T3(i+6)
    dest(i+7)=src(i+7)+T2(i+7)*T3(i+7)
    END DO
CALL DFOR$PREFETCH_EVICT_NEXT(src(len–1))
DOi=i,len–1
dest(i)=src(i)+T2(i)*T3(i)
    END DO
CALL DFOR$EVICT_CACHE_BLOCK(dest(len–62))
CALL DFOR$EVICT_CACHE_BLOCK(dest(len–54))
CALL DFOR$EVICT_CACHE_BLOCK(dest(len–46))
CALL DFOR$EVICT_CACHE_BLOCK(dest(len–38))
RETURN
END The call to CQ_VT_VT_ZT_ZT_OM_OA uses two temporary arrays and will also be directly fetching from user array a(1:n) while directly storing into user array d(1:n). Normally, it is advantageous to have each strip-mine loop only directly access one user array per distributed loop to eliminate cache thrashing. However, on those target machine implementations with a write-back cache, or other write buffering technique, it may be advantageous to have each loop containing a store into a user array also contain a fetch from a user array. On hardware with a write-back cache, a long sequence of stores to a user array will update the write-back cache but the stores to the main memory level of the memory hierarchy will be delayed. Delaying access to main memory reduces the bandwidth to this level of the memory hierarchy. Bandwidth to main memory can be increased by accessing the main memory with fetches to a user array in the same loop that stores to a user array are updating the contents of a write-back cache.

A further example of the use of this invention is the restructuring the following loop:

do 50j=1,n a(j)=a(j)+b(j)*c(j)

50 continue

The technique of this invention will transform the above loop in one embodiment as follows:
PARAMETER (m=256)
DOUBLE PRECISION t1(m),t2(m),t3(m)
   DO40i=1,n,m
   CALL CQ_ZT_VT (MIN(m, n-i+1), t1, b(i))
   CALL CQ_ZT_VT (MIN(m, n—i+1), t2, c(i))
   CALL CQ_VT_R1_ZT_ZT_OM_OA(MIN(m, n-i+1), a(i), t1, t2) 40 CONTINUE
where the routine CQ_ZT_VT is the same as defined as above and the routine CQ_VT_R1_ZT_ZT_OM_OA is defined by:
   SUBROUTINE CQ_VT_RI_ZT_ZT_OM_OA(len, dest, T1, T2)
C dest(0:len-1)=dest(0:len-1)+T1(0:len-1)*T2(0:len-1)
C with prefetch_modify used on the dest array
   REAL * 8 dest(0:*), T1(0:*), T2(0:*)
INTEGER * 8 len, i
CALL DFOR$PREFETCH_MODIFY(dest(0))
CALL DFOR$PREFETCH_MODIFY(dest(8))
CALL DFOR$PREFETCH_MODIFY(dest(16))
CALL DFOR$PREFETCH_MODIFY(dest(24))
DOi=0,len-33, 8
CALL DFOR$PREFETCH_MODIFY(dest(i+32))
   dest(i)=dest(i)+T1(i)*T2(i)
   dest(i+1)=dest(i+1)+T1(i+1)*T2(i+1)
   dest(i+2)=dest(i+2)+T1(i+2)*T2(i+2)
   dest(i+3)=dest(i+3)+T1(i+3)*T2(i+3)
   dest(i+4)=dest(i+4)+T1(i+4)*T2(i+4)
   dest(i+5)=dest(i+5)+T1(i+5)*T2(i+5)
   dest(i+6)=dest(i+6)+TI(i+6)*T2(i+6)
   dest(i+7)=dest(i+7)+Ti(i+7)*T2(i+7)
   END DO
CALL DFOR$PREFETCH_MODIFY(dest(len-1))
DOi=i,len-1
dest(i)=dest(i)+T1(i)*T2(i)
   END DO
RETURN
END In this example, user array a(1:n) is being fetched and then modified. The CQ_VT_R1_ZT_ZT_OM_OA routine uses the prefetch-modify operation of the target machine to better optimize use of the memory hierarchy in this situation.

The above examples use prefetch-evict-next, prefetch-modify, evict-cache-block and write-hint operations of the target machine to optimize use of the memory hierarchy. Those skilled in the art will recognize that the technique of this invention can be used to take advantage of other instructions that optimize memory hierarchy.

Further, the above-described method has assumed that the optimization techniques may be applied to the entire program, potentially affecting all vectorizable memory operations. However, such a global approach may not be required. Rather, it may be useful to first analyze the program to determine where cache misses and/or cache thrashing is occurring, and then apply the optimization techniques described herein to only those portions of the program experiencing these problems. Standard code generation techniques could be applied to the remainder of the program. It is envisioned that a variety of techniques could be used to identify the portions of the program experiencing cache misses and/or cache thrashing. For example, profiling and feedback could be used to locate loops and/or memory references that are encountering cache misses and/or cache thrashing.

If execution profile data contains information about which loop bodies contain instructions that are encountering cache misses and/or cache thrashing, then the execution profile data can be used to direct which loops are restructured using this technique. The techniques of this invention can be applied to those loops where execution profile data indicates that cache misses or cache thrashing are occurring. These techniques need not be applied to those loops where execution profile data indicates that there is no problem with the performance of the memory hierarchy. In this way, execution profile data can reduce the number of loop bodies to which these restructurings would be applied.

If execution profile data contains more detailed information about which individual memory references are encountering cache misses and/or cache thrashing, then the execution profile data can be used to direct how memory references are distributed into detail loops. As much as possible and as permitted by the dependencies, a separate detail loop should be used for each vector memory reference for which execution profile data indicates the occurrence of cache misses or cache thrashing. If there are memory references for which execution profile data indicates no problem with the performance of the memory hierarchy, then those memory references may be placed into any detail loop as may be convenient. In this way, execution profile data can reduce the number of separate detail loops required when restructuring is done using this technique.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
  identifying a loop in a program;
  identifying each vector memory reference in the loop;
  determining dependencies between vector memory references in the loop, including determining unidirectional and circular dependencies;
    distributing the vector memory references into a plurality of detail loops configured to allocate the vector memory references into a plurality of temporary arrays, sized and located, so that none of the vector memory references are cache synonyms, wherein the vector memory references that have circular dependencies therebetween are included in a common detail loop, and wherein the detail loops are ordered according to the unidirectional dependencies between the memory references;
  analyzing an execution profile of the program after said distributing; and based on the execution profile, determining whether to repeat said identifying a loop, said identifying each vector memory reference, said determining dependencies, and said distributing.

2. A method, as set forth in claim 1, further comprising allocating a plurality of temporary storage areas within a cache and determining the size of each temporary storage area based on the size of the cache and the number of temporary storage areas.

3. A method, as set forth in claim 1, further comprising at least one section loop including the plurality of detail loops.

4. A method, as set forth in claim 1, wherein distributing the vector memory references into a plurality of detail loops further comprises distributing the vector memory references into a plurality of detail loops that each contain at least one vector memory reference that could benefit from cache management.

5. A method, as set forth in claim 1, further comprising inserting cache management instructions into at least one of said detail loops to control movement of data associated with the vector memory reference between a cache and main memory.

6. A method, as set forth in claim 1, further comprising inserting prefetch Instructions into at least one of said detail loops to control movement of data associated with the vector memory reference between a cache and main memory.

7. A method, as set forth in claim 1, further comprising performing loop unrolling on at least one of said detail loops to control movement of data associated with the vector memory reference between a cache and main memory.

8. A method, as set forth in claim 1, further comprising inserting at least one of a prefetch instruction and a cache management instruction into at least one of said detail loops to control movement of data associated with the vector memory reference between a cache and main memory, and performing loop unrolling on at least one of said detail loops to control movement of data associated with the vector memory reference between a cache and main memory.

9. A method, comprising:
identifying a loop in a program;
identifying each vector memory reference in the loop;
determining dependencies between vector memory references in the loop; and
distributing the vector memory references into a plurality of detail loops that serially proceed through strips of the vector memory references and store the strips in temporary arrays so that none of the vector memory references are cache synonyms, wherein the vector memory references that have dependencies therebetween are included in a common detail loop;
wherein said distributing the vector memory references into a plurality of detail loops is performed by a first computer for execution by a second computer.

10. A method, as set forth in claim 9, further comprising allocating a plurality of temporary storage areas within a cache and determining the size of each temporary storage area based on the size of the cache and the number of temporary storage areas.

11. A method, as set forth in claim 9, further comprising at least one section loop including the plurality of detail loops.

12. A method, as set forth in claim 9, wherein distributing the vector memory references into a plurality of detail loops further comprises distributing the vector memory references into a plurality of detail loops that each contain at least one vector memory reference that could benefit from cache management.

13. A method, as set forth in claim 9, further comprising inserting cache management instructions into at least one of said detail loops to control movement of data associated with the vector memory reference between a cache and main memory.

14. A method, as set forth in claim 9, further comprising inserting prefetch instructions into at least one of said detail loops to control movement of data associated with the vector memory reference between a cache and main memory.

15. A method, as set forth in claim 9, further comprising performing loop unrolling on at least one of said detail loops to control movement of data associated with the vector memory reference between a cache and main memory.

16. A method, as set forth in claim 9, further comprising inserting at least one of a prefetch instruction and a cache management instruction into at least one of said detail loops to control movement of data associated with the vector memory reference between a cache and main memory, and performing loop unrolling on at least one of said detail loops to control movement of data associated with the vector memory reference between a cache and main memory.

17. A method, comprising:
identifying a loop in a program;
identifying each vector memory reference in the loop;
determining dependencies between vector memory references in the loop;
distributing the vector memory references into a plurality of detail loops in response to cache behavior and the dependencies between the vector memory references in the loop, wherein the detail loops cause storage of the vector memory references in temporary arrays that are allocated consecutively so that no temporary arrays elements are cache synonyms, wherein said identifying a loop, said identifying each vector memory reference, said determining dependencies between vector memory references and said distributing the vector memory references into a plurality of detail loops produce code that is substantially independent of a computer architecture; and
performing code optimizations that are dependent on a computer architecture after said distributing.

18. A method, as set forth in claim 17, wherein distributing the vector memory references further comprises distributing the vector memory references into the plurality of detail loops with each loop having at least one of the identified vector memory references.

19. A method, as set forth in claim 17, further comprising determining dependencies between vector memory references in the loop, and wherein distributing the loop includes distributing the vector memory references into the plurality of detail loops, wherein the vector memory references that have circular dependencies therebetween are included in a common detail loop.

20. A method, as set forth in claim 17, further comprising inserting cache management instructions into at least one of said detail loops to control movement of data associated with the vector memory reference between a cache and main memory.

21. A method, as set forth in claim 17, further comprising inserting prefetch instructions into at least one of said detail loops to control movement of data associated with the vector memory reference between a cache and main memory.

22. A method, as set forth in claim 17, further comprising performing loop unrolling on at least one of said detail loops to control movement of data associated with the vector memory reference between a cache and main memory.

23. A method, as set forth in claim 17, further comprising inserting at least one of a prefetch instruction and a cache management instruction into at least one of said detail loops to control movement of data associated with the vector memory reference between a cache and main memory, and performing loop unrolling on at least one of said detail loops to control movement of data associated with the vector memory reference between a cache and main memory.

24. A computer programmed to perform a method, comprising:
   identifying a loop in a program;
   identifying each vector memory reference in the loop;
   determining dependencies between vector memory references in the loop; and
   distributing the vector memory references into a plurality of detail loops configured to retrieve strips of the vector memory references and store the strips in temporary arrays, wherein the vector memory references that have circular dependencies therebetween are included in a common detail loop,
   wherein the temporary arrays are configured to simultaneously fit in a single cache bank.

25. A program storage medium encoded with instructions that, when executed by a computer, perform a method, comprising:
   identifying a loop in a program;
   identifying each vector memory reference in the loop;
   determining dependencies between vector memory references in the loop; and
   generating an expanded code of the program by distributing the vector memory references into a plurality of detail loops configured to allocate the vector memory references into temporary arrays that avoid cache synonyms, wherein the vector memory references that have circular dependencies therebetween are included in a common detail loop,
   wherein the expanded code is substantially independent of computer architectures.

26. A method for reducing the likelihood of cache thrashing by software to be executed on a computer system having a cache, comprising:
   executing the software on the computer system;
   generating a profile indicating the manner in which the software uses the cache;
   identifying a portion of the software that exhibits cache thrashing based on the profile data; and
   modifying the identified portion of the software to reduce the likelihood of cache thrashing by distributing cache synonyms into detail loops configured to allocate the cache synonyms into temporary storage areas, sized and located, to prevent cache thrashing,
   wherein said modifying occurs before optimizations that are based on an architecture of the computer system.

27. A method, as set forth in claim 26, wherein modifying the identified portion of the software to reduce the likelihood of cache thrashing further comprises:
   identifying a loop in the identified portion of the software;
   identifying each vector memory reference in the identified loop;
   determining dependencies between the vector memory references in the identified loop of the software, including determining unidirectional and circular dependencies; and
   reducing cache thrashing by distributing the vector memory references into a plurality of detail loops, wherein the vector memory references that have circular dependencies therebetween are included in a common detail loop, and wherein the detail loops are ordered according to the unidirectional dependencies between the memory references.

28. A method for reducing the likelihood of cache thrashing by software to be executed on a computer system having a cache, comprising:
   executing the software on the computer system;
   generating a profile indicating the manner in which the memory references of the software use the cache;
   identifying a portion of the memory references based on the profile,
   wherein the portion of the memory references is determined to cause cache thrashing; and
   reducing cache thrashing by distributing the portion of the memory references into distinct loops that allocate strips of the memory references into temporary arrays for execution,
   wherein the temporary arrays are configured to simultaneously fit in a single cache bank.

29. The computer of claim 24 wherein the temporary arrays are allocated consecutively such that no temporary array elements are cache synonyms.

30. The computer of claim 24 wherein the details loops are allocated into section loops that cause iterative execution of the detail loops based on a size of the strips.

31. The program storage medium of claim 25 wherein the temporary arrays are allocated consecutively such that no temporary array elements are cache synonyms.

32. The method of claim 28 wherein the temporary arrays are located and sized to reduce cache thrashing.

33. The method of claim 28 wherein the temporary arrays are allocated consecutively and iteratively executed by a size of the strips.

* * * * *

UNITED STATES PATENT AND TRADEMARK OFFICE
CERTIFICATE OF CORRECTION

PATENT NO. : 7,107,583 B2
APPLICATION NO. : 09/785143
DATED : September 12, 2006
INVENTOR(S) : Steven Orodon Hobbs et al.

It is certified that error appears in the above-identified patent and that said Letters Patent is hereby corrected as shown below:

In column 1, line 11, delete "modem" and insert -- modern --, therefor.

In column 1, line 19, delete "modem" and insert -- modern --, therefor.

In column 6, line 14, delete "Vectorizatlon" and insert -- Vectorization --, therefor.

In column 8, line 36, delete "n–$j_{13}$ outer)" and insert -- n–j _ outer) --, therefor.

In column 8, line 38, delete "n–$j_{13}$ outer)" and insert -- n–j _ outer) --, therefor.

In column 8, line 40, delete "n–$j_{13}$ outer)" and insert -- n–j _ outer) --, therefor.

In column 8, line 42, delete "n–$j_{13}$ outer)" and insert -- n–j _ outer) --, therefor.

In column 13, line 14, delete "(m, n—i+1)" and insert -- (m, n-i+1) --, therefor.

In column 15, line 24, in Claim 6, delete "Instructions" and insert -- instructions --, therefor.

Signed and Sealed this

Sixth Day of January, 2009

JON W. DUDAS
*Director of the United States Patent and Trademark Office*